No. 639,879. Patented Dec. 26, 1899.
E. WINANS.
POWER TRANSMITTING MACHINERY.
(Application filed July 3, 1899.)
(No Model.)
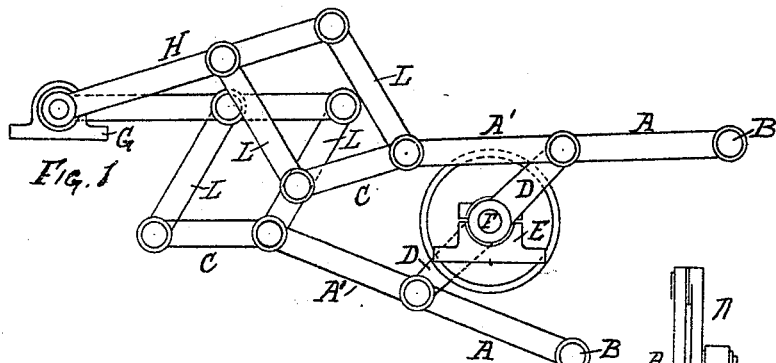
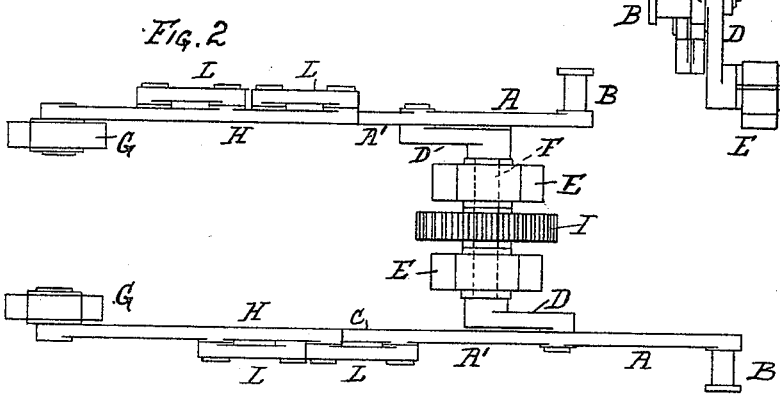
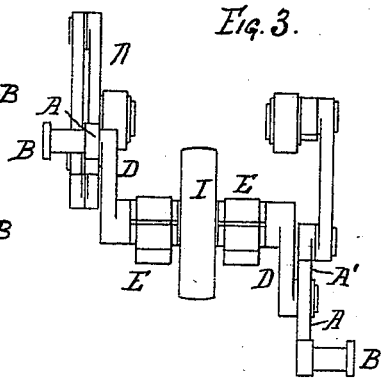
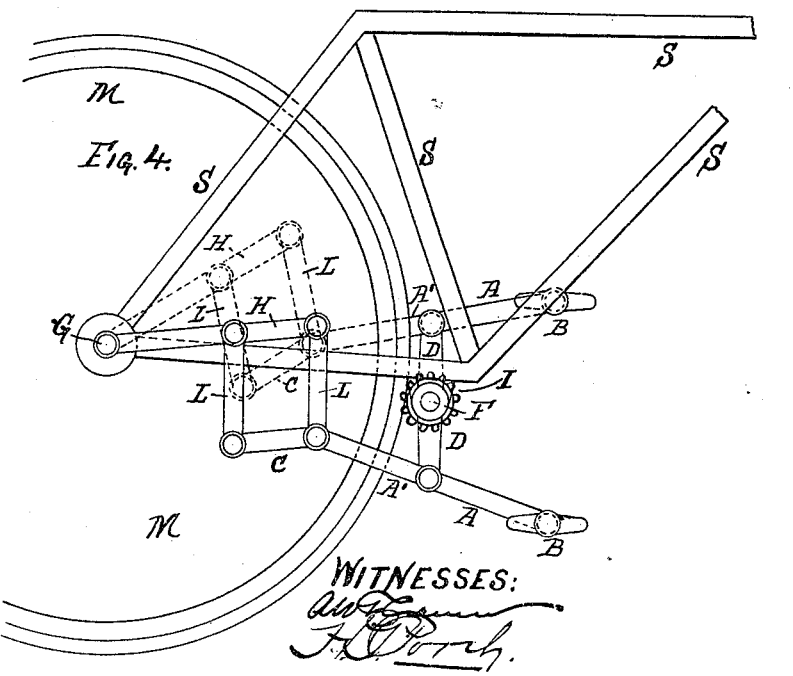
WITNESSES:
INVENTOR:—
Edwin Winans
by
W. H. Weightman,
atty.

UNITED STATES PATENT OFFICE.

EDWIN WINANS, OF NEW YORK, N. Y.

POWER-TRANSMITTING MACHINERY.

SPECIFICATION forming part of Letters Patent No. 639,879, dated December 26, 1899.

Application filed July 3, 1899. Serial No. 722,672. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates to and has for its object the improvement of machinery by and through which power or force is transmitted from the place of development to that of its applied usefulness. It is applicable to all swing and crank motions, especially to all of the treadle class—namely, the sewing-machine, the lathe, the jig-saw, and similar apparatus. It is applicable to the transmission of the higher powers and forces of steam and pressure class, especially where even and steady crank revolutions are desired. It is applicable to high duty in bicycle practice, the essential features of which are presented and described in the drawings and specification.

A general aim and object of my invention is to ease the labor and motion of an operator in treadling by providing for a full, free, and unhindered up-and-down swing and sway to the whole leg and foot while at work.

Certain of my improvements consist in the adaptation, combination, and location of a plurality of parallel bars or links with operating-levers to assist in the power transmission and passing of centers.

Other improvements consist in the construction, arrangement, and combination of the several parts, portions, or details, as hereinafter shown and described.

Referring to the drawings, Figure 1 represents an elevation of power-transmitting cranks, connections, bearings, &c., embodying my invention and improvements. Figs. 2 and 3 represent plan and side views of the same. Fig. 4 represents a partial elevation of a bicycle provided with apparatus embodying my improvements.

In the several figures of the drawings letter A designates a force-receiving lever, such force being applied to and received by pin B through the use of treadle, connecting-rod, piston-rod, or similar connections.

Letter A' designates an extension of lever A.

C designates a further extension of the lever A.

D designates an operating-crank attached to shaft F and receiving force from lever A.

Letter E designates main bearing or bearings for crank and shaft.

G designates a fulcrum or swing bearing for a motion-controlling bar H.

Letters L L designate parallel links connecting the controlling-bar H with the extension portion C of the power, force, or motion receiving lever A.

Letter I designates a transmitting pulley, gear, or sprocket-wheel or equivalent means for effecting additional or extended power transmission or speed of revolution.

M designates a bicycle-wheel in disk form with all spokes omitted, the connections on off side of wheel being dotted for purposes of clearer distinction. In bicycle practice the power may be taken directly through a chain of gears or sprocket and chain providing for increased revolution.

Letter S designates the body framework of a bicycle, and operating-treadles are shown at B. (See Fig. 4.)

In the operation of the apparatus force is applied at B, through treadle, pitman, connection, or similar means, and hence through crank D to shaft F for use. The continuation A' may be long or short, according to distance between bearings E and G and the angularity of extension C with lever A, or its continuation A' may vary and must vary according to the elevated or depressed position of fulcrum-bearing G with reference to shaft-bearing E. In the drawings the fulcrum-bearing G is shown slightly higher than shaft-bearing E, with consequent angle of C with lever and extension A and A'.

What I claim as new, and desire to secure by Letters Patent, is—

In combination with a power-shaft and a crank and crank-pin of said shaft, a force-receiving lever connecting with and operating said crank-pin, an extension of said force-receiving lever beyond said crank-pin, a controlling-bar and its fulcrum, and a pair of links connecting the said lever extension with the said controlling-bar as and for the purposes set forth.

EDWIN WINANS.

Witnesses:
 WM. H. WEIGHTMAN,
 HENRY J. WEHLE.